April 11, 1961  M. A. DONOHOE  2,978,921
RING GEAR AND DIFFERENTIAL CASE ASSEMBLY
Filed March 5, 1959

INVENTOR.
MARTIN A. DONOHOE
BY
Richard W. Treverton
ATTORNEY

United States Patent Office 2,978,921
Patented Apr. 11, 1961

2,978,921

RING GEAR AND DIFFERENTIAL CASE ASSEMBLY

Martin A. Donohoe, Rochester, N.Y., assignor to The Gleason Works, Rochester, N.Y., a corporation of New York Filed Mar. 5, 1959, Ser. No. 797,519

2 Claims. (Cl. 74—447)

The present invention relates to a ring gear and differential case assembly.

Conventional automotive drive axles have a bevel or hypoid ring gear mounted on a case containing differential gears which transmit the drive torque from the case to the axle shafts. In manufacture of the ring gear, the blank, a steel forging, is first machined and then is hardened by heating and quenching. Thereafter its bore, which seats on the case, is finish ground and the gear teeth are lapped by running the gear in mesh with its mate pinion while a lubricant containing a finely divided abrasive is applied to the tooth surfaces. In assembly the ring gear is usually secured to the differential cases by screws, although rivets are sometimes employed. In either event cylindrical openings for the fasteners are drilled in the ring gears, prior to the hardening operation.

These cylindrical openings result in distortion of the gears during the hardening operation, so changing the shape of the teeth adjacent to the holes that the gears are noisy in operation. In some instances the distortion is relatively small and can be removed, or sufficiently reduced, by the lapping operation, but in other cases the deformation is so large that the gears remain noisy, and in extreme cases must be scrapped.

I have found that by omitting the cylindrical openings and substituting for them shallow recesses in the inner bore of the gear, the distortion occurring during heat treatment is greatly reduced. This results in quieter gears, enables a reduction in lapping time, and decreases scrap losses. I have formed the shallow recesses of semi-cylindrical shape, making them complementary to semi-cylindrical recesses which I provide on the external cylindrical surface of the differential case on which the gear is seated. The arrangement is such that the shanks of the fasteners can extend through the complementary recesses, and through openings through the case which are aligned with the recesses. Because of the limited space between the toothed portion of the ring gear and the adjacent surface of the case in present day axle designs, ordinary fasteners of the screw-and-nut or rivet type usually are not feasible, but I have avoided difficulty on this score by using explosive rivets which do not require the use of a rivet head-forming tool.

Figure 1:
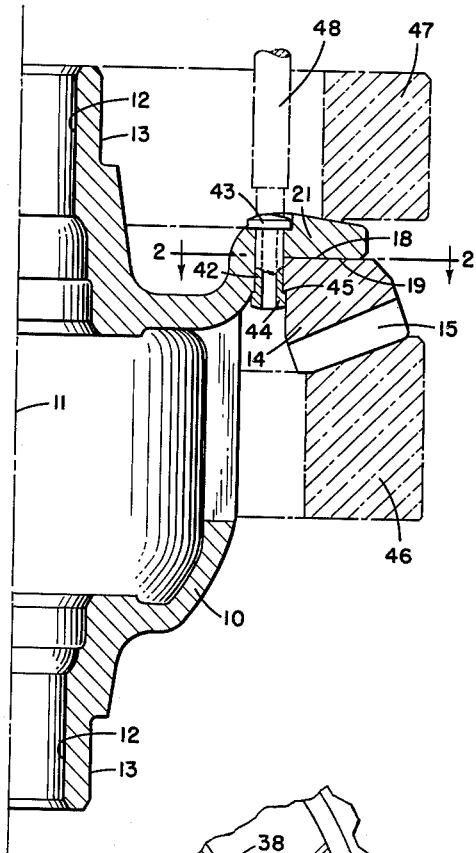
Fig. 1 is an axial section through the differential case and ring gear, showing the manner in which these parts are clamped while the fasteners are applied.

Referring to Fig. 1, the differential case 10 is a substantially tubular part, approximately symmetrical about its axis of rotation 11. The case has at its opposite ends inner cylindrical surfaces 12 which rotatably support the journal portions of the axle shafts (not shown) and outer cylindrical surfaces 13 which seat the inner races of roller bearings (also not shown) which support the case rotatably in an axle housing. The ring gear 14, having on its front face teeth 15 of the spiral bevel or hypoid type, has its inner bore 16 seating on an external cylindrical surface 17 of the case and its back face 18 seating against inner face 19 of a peripheral flange 21 of the case.

Figure 4:
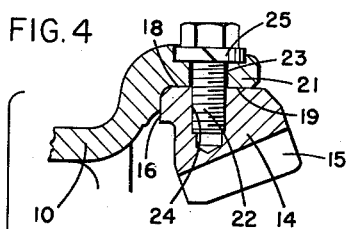
Figs. 4 and 5 are views similar to Fig. 3 showing conventional means for securing ring gears to differential cases.
Figure 5:
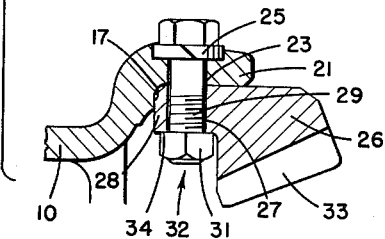

Usually the ring gear is secured to the case by screws, as shown in Figs. 4 and 5. In Fig. 4, a headed screw 22 extends through a plain bore 23 in flange 21 and into a tapped, screw-threaded bore 24 in the body of ring gear 14. A lock washer 25 is positioned under the screw head. It will be understood that a number of such screws are arranged in circle around the differential case-ring gear assembly.

An alternative form of ring gear, shown at 26 in Fig. 5, has fastener-receiving openings 27 extending through inner circumferential flange 28 of the gear, rather than into the gear body proper as in Fig. 4. The fasteners comprise headed screws 29 which are screw-threaded into nuts 31, there being sufficient space 32 between the inner ends of the gear teeth 33 and the adjacent surface of the case 10 to accommodate the nuts. Lock washers 25 are also provided in this arrangement, although sometimes self-locking nuts are employed instead.

In still other instances generally like that shown in Fig. 5, the nuts 31 are omitted, and screws essentially like those designated 22 are screw-threaded into the openings 27 in flange 28. In this event these openings are of course provided with internal screw-threads. In still other instances the screw-and-nut fasteners 29, 31 may be replaced by rivets, not shown, whose shanks extend through aligned openings 23, 27 and are upset by a suitable riveting tool to provide rivet heads overlying the face 34 of flange 28, while the preformed heads of the rivets engage the outer face of case flange 21.

However, in either situation, whether the fastener-receiving openings are blind holes, as in Fig. 4, or through-openings, as in Fig. 5, distortion of the gears traceable to the openings occurs during heat treatment.

Figure 3:
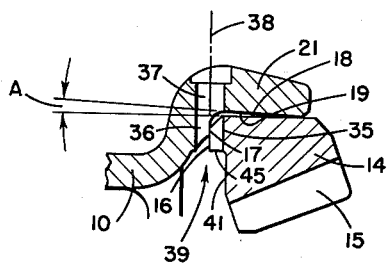
Fig. 3 is a view in the plane of Fig. 1, showing the relation of the differential case to the ring gear prior to the riveting operation.
Figure 2:
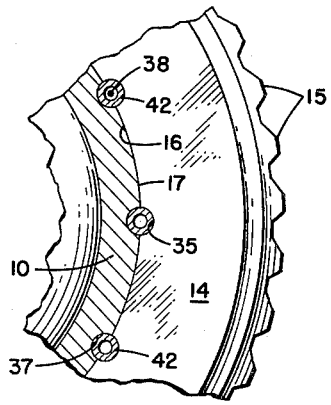
Fig. 2 is a sectional view in plane 2—2 of Fig. 1.

According to the invention such openings are eliminated, being replaced by shallow recesses or indentations 35, Figs. 2 and 3, in the internal cylindrical surface 16 of the gear. I have formed these recesses with semi-cylindrical surfaces complementary to semi-cylindrical recesses 36 formed in the case 10. The recesses 36 really constitute continuations of cylindrical openings 37 that are drilled through the flange 21 parallel to axis 11, with the cylinder axes 38 approximately coincident with elements of cylindrical surfaces 17 of the case.

There being insufficient space for a screw head or nut in area 39 between surface 41 of the gear and the adjacent surfaces of case 10, and also insufficient space for a suitable riveting tool, I have employed explosive rivets 42 to secure the gear to the case, the tubular shanks of these rivets being inserted into the openings 37 and thence through the complementary recesses 35, 36. The rivets are exploded by heat applied to their preformed heads 43, and when thus exploded they expand to tightly fill the openings 35, 36, 37 and to form heads 44 which overlie the front face portion 45 of the gear. The riveting operation is preferably performed while the gear and case are held clamped together in a suitable press, for example between annular dies 46, 47, Fig. 1, and while the preformed rivet heads 43 are held firmly against the outer faces of flange 21 by suitable clamp means 48. If desired the means 48 may comprise electrically or otherwise heated rods that serve to explode the rivets as well as holding them in place. However, I have successfully exploded such rivets by means of an acetylene flame directed against the rivet heads.

In order to assure a tight joint between the gear and case, I prefer to slightly dish the flange surface 19. That is, as shown very greatly exaggerated in Fig. 3, the surface 19 is preformed as a shallow internal conical surface, disposed at a slight angle A to the plane back face 18 of the gear. I have made this angle A such that the distance between surfaces 18 and 19, at the inner margins where they are most widely separated, is about four thousandths of an inch (0.004″). When pressure is applied through the dies 46, 47 prior to and during riveting, the flange 21 is flexed to bring surfaces 18 and 19 into tight surface contact, in which condition they are held thereafter by the rivets.

Gears formed with shallow recesses 35 as shown in Figs. 2 and 3 have shown little or no distortion traceable to such recesses, and thus eliminate a serious problem that heretofore has existed in the manufacture of automotive axle drive gears. The recesses on one hand eliminate the necessity of a flange wide enough to accommodate through-openings of the kind shown in Fig. 5, thereby allowing for the same overall weight a more massive ring gear body proper which is less likely to distort in heat treatment, and on the other hand they avoid any need for openings in the ring gear body proper such as are shown in Fig. 4. Obviously various forms of screw-threaded and riveted fasteners may be extended through such recesses 35 to secure the gears to the cases, but the explosive rivets have the advantage that they can be employed in designs where other fasteners are not feasible, especially designs wherein the external diameter of the case 10 is only slightly smaller than the diameter of internal surface 41 of the ring gear. Moreover they expand to solidly fill the openings 35, 36, 37 even when the latter are somewhat misaligned due to manufacturing tolerances.

The semi-cylindrical recesses 35 may be formed in various ways. However, the internal surface 16 of the gear is usually formed in a broaching operation, and the recesses may be formed by substantially semi-circular protuberances provided on the broach. The protuberances preferably are so shaped that after the finish grinding of the bore, subsequent to hardening, the recesses will be of semi-cylindrical shape.

What I claim as my invention is:

1. An assembly comprising a ring gear and a flanged member constituting a gear hub, said gear having a cylindrical bore and a plane back face seating respectively on a cylindrical surface of said member and on an approximately plane surface of the flange of said member, the bore of the gear and said cylindrical surface having complementary semi-cylindrical recesses whose cylinder axes are parallel to the axis of said bore, and said member having substantially cylindrical openings aligned with and constituting extensions of said complementary recesses, and headed rivets extending through said aligned openings and recesses, each of said rivets having at one end thereof a preformed head abutting the member and having at the opposite end thereof a deformed head of which a portion abuts said gear and another portion abuts said member.

2. An assembly according to claim 1 in which said approximately plane surface of the flange is preformed as a dished surface and is held flexed into surface contact with said plane back face of the gear by said rivets.

References Cited in the file of this patent

UNITED STATES PATENTS

| | | |
|---|---|---|
| 1,352,021 | Opperman | Sept. 7, 1920 |
| 1,412,185 | Leipert | Apr. 11, 1922 |
| 1,532,557 | Sturt | Apr. 7, 1925 |
| 1,536,824 | Domizi | May 5, 1925 |
| 1,569,664 | Mogford | Jan. 12, 1926 |
| 1,968,618 | Padgett et al. | July 31, 1934 |
| 2,556,465 | Burrows et al. | June 12, 1951 |

FOREIGN PATENTS

| | | |
|---|---|---|
| 324,960 | Germany | Sept. 8, 1920 |
| 67,944 | Switzerland | Feb. 1, 1915 |
| 709,619 | Great Britain | May 26, 1954 |
| 513,175 | Italy | Feb. 3, 1955 |